(12) United States Patent  
Ikushima et al.

(10) Patent No.: US 7,965,788 B2  
(45) Date of Patent: Jun. 21, 2011

(54) DATA RECEIVING APPARATUS

(75) Inventors: Tsuyoshi Ikushima, Nara (JP); Masaru Fuse, Osaka (JP); Satoshi Furusawa, Osaka (JP); Tomokazu Sada, Osaka (JP)

(73) Assignee: Panasonic Corporation, Osaka (JP)

( * ) Notice: Subject to any disclaimer, the term of this patent is extended or adjusted under 35 U.S.C. 154(b) by 628 days.

(21) Appl. No.: 12/127,393

(22) Filed: May 27, 2008

(65) Prior Publication Data

US 2009/0323852 A1    Dec. 31, 2009

(30) Foreign Application Priority Data

May 29, 2007    (JP) ................................. 2007-142230

(51) Int. Cl.  
*H04L 25/34* (2006.01)

(52) U.S. Cl. ........ 375/286; 375/262; 375/298; 375/341; 714/780; 714/794

(58) Field of Classification Search .................. 375/286, 375/262, 298; 714/780, 794  
See application file for complete search history.

(56) References Cited

U.S. PATENT DOCUMENTS

| | | | |
|---|---|---|---|
| 6,526,539 B1 * | 2/2003 | Yano et al. ..................... 714/794 |
| 2003/0018941 A1 * | 1/2003 | Miyata et al. ................. 714/780 |
| 2003/0138056 A1 * | 7/2003 | Uesugi et al. ................. 375/262 |
| 2007/0234051 A1 * | 10/2007 | Akutsu et al. ................. 713/168 |
| 2007/0255679 A1 * | 11/2007 | Hosoi et al. ....................... 707/1 |
| 2009/0158128 A1 * | 6/2009 | Yokokawa et al. ........... 714/780 |

FOREIGN PATENT DOCUMENTS

| JP | 2005-57313 | 3/2005 |
|---|---|---|
| JP | 2006-303927 | 11/2006 |

* cited by examiner

*Primary Examiner* — Eva Y Puente  
(74) *Attorney, Agent, or Firm* — Wenderoth, Lind & Ponack, L.L.P.

(57) ABSTRACT

To provide a receiving apparatus which is capable of demodulating information data from a multi-level modulated signal, which is generated by using a Y-00 protocol, without using high-performance component parts. In the receiving apparatus, the soft decision section 211 performs soft decision on the multi-level signal 22, in which a fixed decision level is used. A converted data identification section 214 performs logical decision on a value of the converted information data 25 in accordance with a highest-order bit of a multi-level code sequence 23 and a decision result 24 of the soft decision. A data reproduction section 215 performs an XOR operation between the converted information data 25 and a lowest-order bit of the multi-level code sequence 23, and outputs a resultant thereof as information data 23. Accordingly, the receiving apparatus identifies the information data 23 by using only some of the bits of the multi-level code sequence 23, whereby precision requirements for the component parts to be used can be eased.

6 Claims, 13 Drawing Sheets

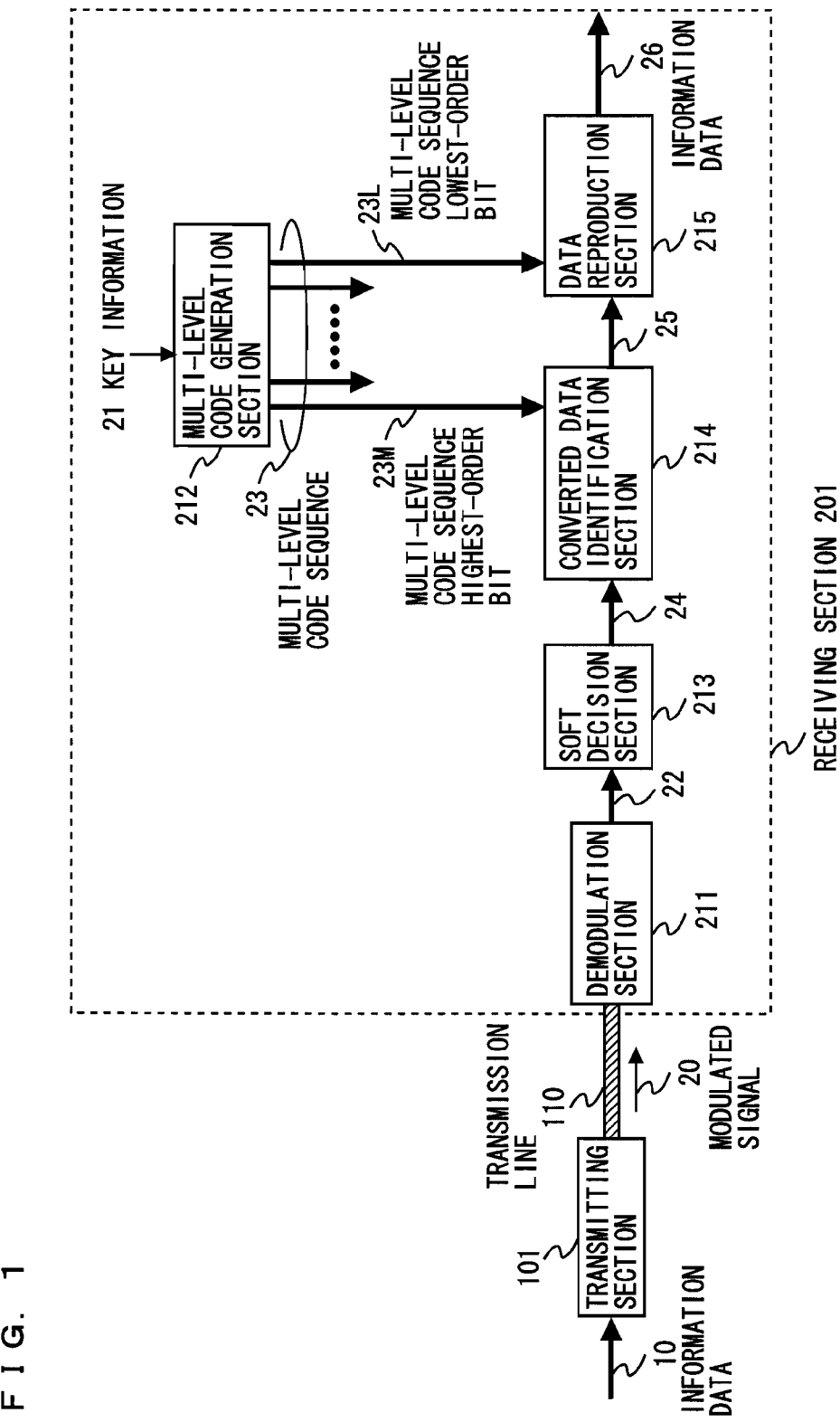
F I G. 1

EXEMPLARY SETTING OF CLASSIFICATION LEVEL (1)

IDENTIFICATION METHOD OF CONVERTED INFORMATION DATA

|  |  | MULTI-LEVEL CODE SEQUENCE HIGHEST-ORDER BIT | |
|---|---|---|---|
|  |  | 0 | 1 |
| DECISION RESULT | C1 | 1 | 1 |
|  | U | 1 | 0 |
|  | C0 | 0 | 0 |

EXEMPLARY SETTING OF CLASSIFICATION LEVEL (2)

IDENTIFICATION METHOD OF CONVERTED INFORMATION DATA

| | | MULTI-LEVEL CODE SEQUENCE HIGH-ORDER 2 BITS | | | |
|---|---|---|---|---|---|
| | | 00 | 01 | 10 | 11 |
| DECISION RESULT | C1 | 1 | 1 | 1 | 1 |
| | UA | 1 | 1 | 1 | 0 |
| | UB | 1 | 1 | 0 | 0 |
| | UC | 1 | 0 | 0 | 0 |
| | C0 | 0 | 0 | 0 | 0 |

F I G. 7
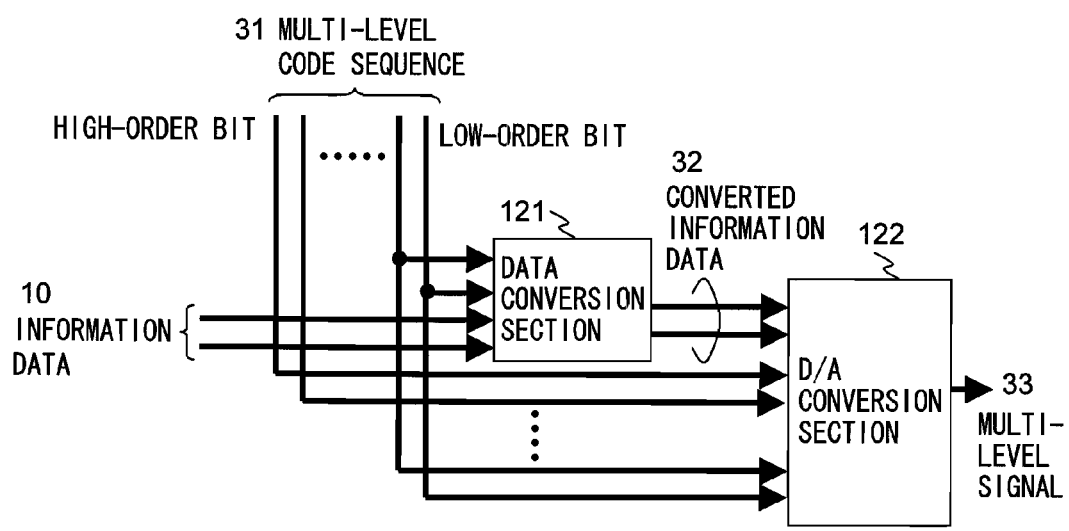

FIG. 10

IDENTIFICATION METHOD OF CONVERTED
INFORMATION DATA

| | | MULTI-LEVEL CODE SEQUENCE HIGHEST-ORDER BIT | |
|---|---|---|---|
| | | 0 | 1 |
| DECISION RESULT | C3 | 3 | 3 |
| | U3 | 3 | 2 |
| | C2 | 2 | 2 |
| | U2 | 2 | 1 |
| | C1 | 1 | 1 |
| | U1 | 1 | 0 |
| | C0 | 0 | 0 |

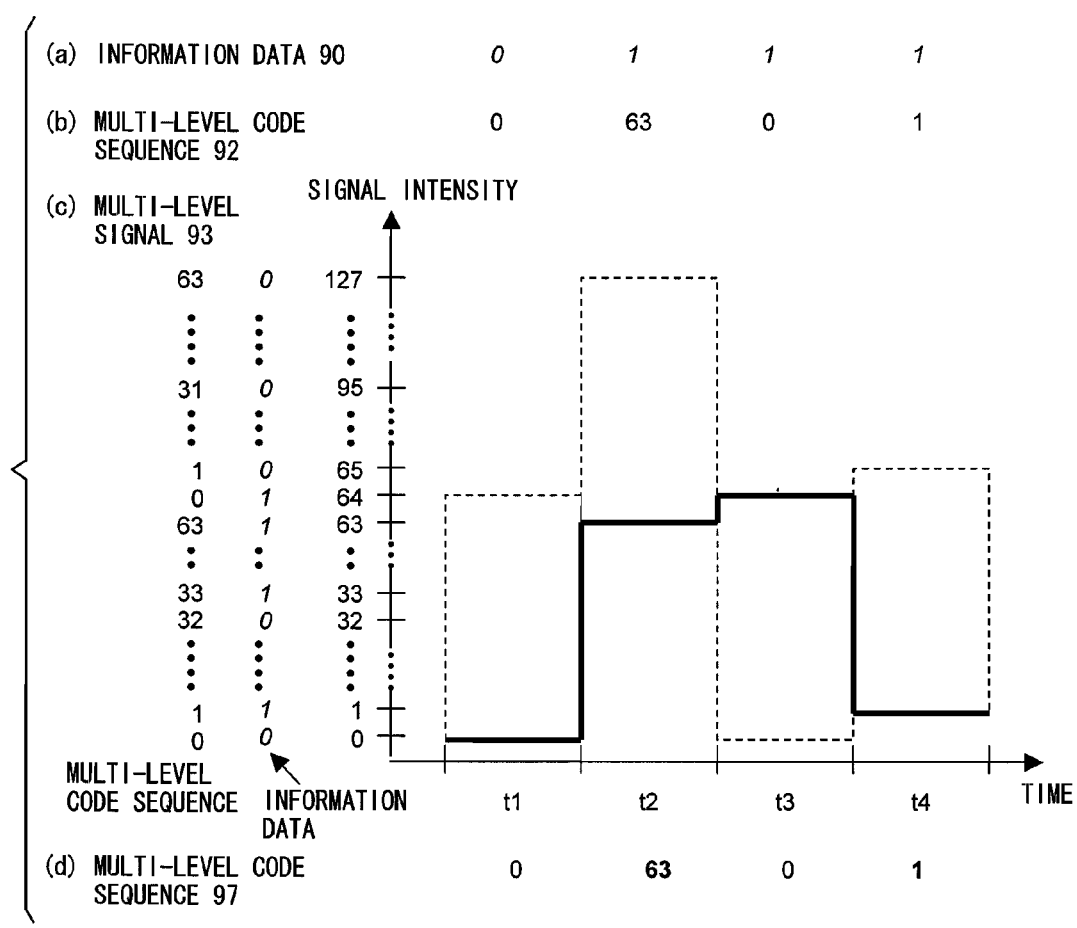

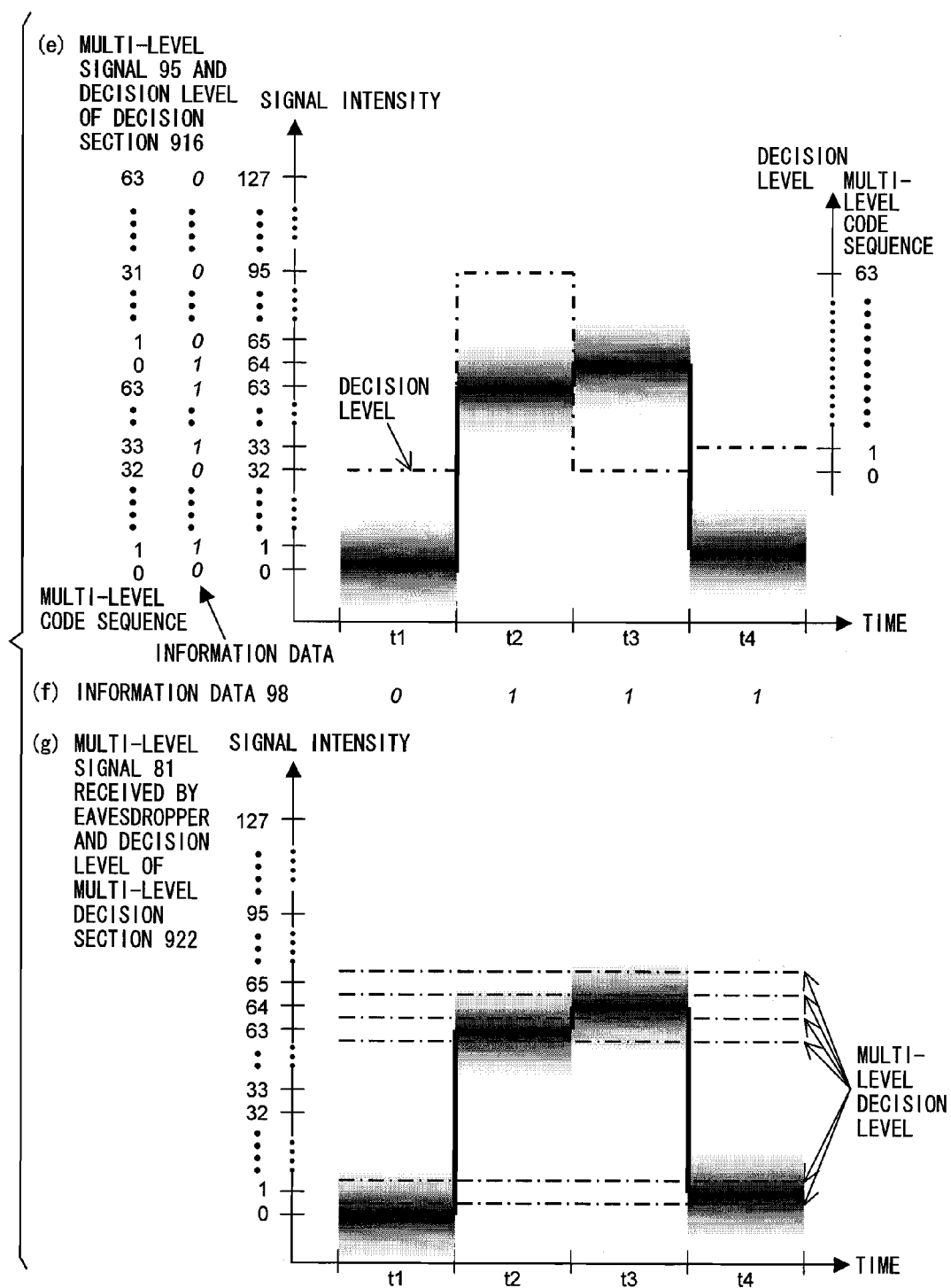

DATA RECEIVING APPARATUS

BACKGROUND OF THE INVENTION

1. Field of the Invention

The present invention relates to an apparatus for performing cipher communication which avoids unauthorized eavesdropping and interception by a third party. More specifically, the present invention relates to a data receiving apparatus performing data communication between legitimate transmitting and receiving parties by selecting/setting a specific encoding/decoding (modulating/demodulating) method.

2. Description of the Background Art

Conventionally, in order to perform communication between specific parties, there has been adopted a configuration in which original information (hereinafter referred to as key information) is shared between transmitting and receiving ends so as to perform an arithmetic operation (encoding) and an inverse operation (decoding) on plain text, which is information data to be transferred, and then secret communication is realized.

On the other hand, there have been suggested, in recent years, several encryption methods, which positively utilize physical phenomenon occurring in a transmission line. As one of the encryption methods, there is a method called a Y-00 protocol for performing the secret communication by utilizing a quantum noise generated in the transmission line.

FIG. 11 is a diagram showing an example of conventional transmitting and receiving apparatuses using the Y-00 protocol disclosed in Japanese Laid-Open Patent Publication No. 2005-57313 (hereinafter referred to as Patent Document 1). Hereinafter, configurations and operations of the conventional transmitting and receiving apparatuses disclosed in Patent Document 1 will be described. As shown in FIG. 11, the conventional transmitting and receiving apparatuses include a transmitting section 901, a receiving section 902 and a transmission line 910. The transmitting section 901 includes a first multi-level code generation section 911, a multi-level processing section 912 and a modulation section 913. The receiving section 902 includes a demodulation section 915, a second multi-level code generation section 914 and a decision section 916. The eavesdropper receiving section 903 is used by an intercepting party, and is not included in the conventional transmitting and receiving apparatus.

First, the transmitting section 901 and the receiving section 902 previously retain first key information 91 and second key information 96, respectively, which are key information identical in content to each other. An operation of the transmitting section 901 will be described. In the transmitting section 901, the first multi-level code generation section 911 generates, by using the first key information 91, a multi-level code sequence 92, which is a multi-level pseudo random number series having M bits of values from "0" to "M−1" (M is an integer of 2 or more), by means of a pseudo random number generator. The multi-level processing section 912 generates, based the information data 90 and the multi-level code sequence 92, which are to be transmitted to the receiving section 902, a multi-level signal 93 which is an intensity modulated signal, by using a signal format described hereinbelow.

FIG. 12 is a diagram showing the signal format used by the multi-level processing section 912. As shown in FIG. 12, in the case where the number of bits of the values included in the multi-level code sequence 92 is M, a signal intensity thereof is divided into 2M signal intensity levels (hereinafter simply referred to as levels). That is, these levels are paired up into M pairs (hereinafter the pairs being referred to as bases), and to one level of each of the bases, a value "0" of the information data 90 is allocated, and to the other level, a value "1" of the information data 90 is allocated. Generally, the allocation is made such that the levels corresponding to the value "0" of the information data 90 and the levels corresponding to the value "1" of the information data 90 are distributed evenly over the whole of the 2M levels. In FIG. 12, the value "0" is allocated to lower levels of even-numbered bases, and the value "1" is allocated to higher levels of the same. On the other hand, the value "1" is allocated to the lower levels of odd-numbered bases, and the value "0" is allocated to the higher levels of the same. Accordingly, the values "0" and "1" of the information data 90 are allocated alternately to each of the 2M levels.

The multi-level processing section 912 selects bases corresponding to the bits of the values of the multi-level code sequence 92 having been inputted, then selects one level of each of the bases, the one level corresponding to the value of the information data 90, and then outputs a multi-level signal 93 having the selected levels. As the multi-level processing section 912, a configuration as shown in FIG. 13 may be used, for example. As shown in FIG. 13, the data conversion section 931 performs an XOR operation between information data 90 and a lowest-order bit of the multi-level code sequence 92, and then outputs a resultant of the operation as converted information data 61. The processing is equivalent to the above-described processing in which the values "0" and "1" of the information data 90 are alternately allocated to the above-described levels. The converted information data 61 and respective bits of the multi-level code sequence 92 are inputted to the D/A conversion section 932 (the converted information data 61 is inputted as a high-order bit), and are subject to a D/A conversion. A resultant of the D/A conversion is outputted as a multi-level signal 93.

The modulation section 913 converts the multi-level signal 93 outputted by the multi-level processing section 912 into a modulated signal 94, which is an optical intensity modulated signal, and transmits the modulated signal 94 to the receiving section 902 via the transmission line 910. In Patent Document 1, the first multi-level code generation section 911 is described as a "transmitting pseudo random number generation section", the multi-level processing section 912 as a "modulation method specification section" and a "laser modulation driving section", the modulator section 913 as a "laser diode", the demodulator section 915 as a "photo-detector", the second multi-level code generation section 914 as a "receiving pseudo random number generation section", and the decision section 916 as a "decision circuit".

Next, an operation of the receiving section 902 will be described. In the receiving section 902, the demodulation section 915 converts the modulated signal 94, which is transmitted via the transmission line 910, from an optical signal to an electrical signal (hereinafter the conversion being referred to as photoelectric conversion), and outputs a resultant signal as a multi-level signal 95. The second multi-level code generation section 914 generates, by using the second key information 96, a multi-level code sequence 97, which is a multi-level pseudo random number series and which is equal to the multi-level code sequence 92. In accordance with respective bits of values of the multi-level code sequence 97 inputted by the second multi-level code generation section 914, the decision section 916 determines each of the bases used for generating the multi-level signal 95. The decision section 916 performs binary decision by using the determined bases and the multi-level signal 95 which is inputted by the demodulation section 915, and obtains information data 98 which is equal to the information data 90.

As the decision section 916, a configuration shown in FIG. 14 may be used. As shown in FIG. 14, the respective bits of the multi-level code sequence 97 are inputted to a D/A conversion section 941, and are subject to the D/A conversion. A resultant of the D/A conversion is outputted as a decision level 71. A binary decision circuit 942 performs a binary decision on the multi-level signal 95 by using the decision level 71, and outputs a resultant thereof as converted information data 72. A data reproduction section 943 performs the XOR operation between the converted information data 72 and a lowest-order bit of the multi-level code sequence 97, and outputs a resultant thereof as information data.

FIG. 15 is a diagram illustrating, in detail, an operation of a conventional transmitting apparatus. FIG. 16 is a diagram illustrating, in detail, an operation of a conventional receiving apparatus. Hereinafter, with reference to FIGS. 15 and 16, the operations of the conventional transmitting and receiving apparatuses in the case where the number of the bits of the values included in the multi-level code sequence 92 is 64 (M=64) will be described in detail. As indicated by (a) and (b) shown in FIG. 15, an exemplary case will be described where a value of the information data 90 changes "0, 1, 1, 1", and a value of the multi-level code sequence 92 changes "0, 63, 0, 1". In this case, a level of the multi-level signal 93 in the transmitting section 901 changes "0, 63, 64, 1", as shown in FIG. 15(c).

Specifically, at a time period t1 shown in FIG. 15 (c), a 0th base (a pair of level 0 and level 64) corresponding to a value "0" of the multi-level code sequence 92 is selected. Next, level 0 of the 0th base corresponding to a value "0" of the information data 90 is selected, and the selected level 0 comes to a level of the multi-level signal 93 at the time period t1. In a similar manner, at a time period t2, a 63rd base (a pair of level 63 and level 127) corresponding to a value "63" of the multi-level code sequence 92 is selected. Next, level 63 of the 63rd base corresponding to the value "1" of the information data 90 is selected, and the selected level 63 comes to the level of the multi-level signal 93 at the time period t2. In a similar manner, the level of the multi-level signal 93 is selected in time periods t3 and t4. In this manner, at each of the time periods t1 and t3, in which the value of the multi-level code sequence 92 is even numbered, the lower level of the base corresponds to "0" of the information data, and the higher level of the base corresponds to the value "1" of the information data. On the other hand, at each of the time periods t2 and t4, in which the value of the multi-level code sequence 92 is odd numbered, the lower level of the base corresponds to "1" of the information data, and the higher level of the base corresponds to "0" of the information data.

The multi-level signal 95 inputted to the decision section 916 in the receiving section 902 is a signal which changes as shown in FIG. 16(e), and which includes a noise such as a shot noise generated at the time of the photoelectric conversion performed by the demodulation section 915. The decision section 916 selects the respective bases corresponding to the respective bits of values of the multi-level code sequence 97 (see FIG. 15(d)), which is equal to the multi-level code sequence 92, and sets an intermediate level of each of the bases as a decision level, as shown in FIG. 16(e). The decision section 916 then determines whether the multi-level signal 95 is higher or lower than the decision level.

Specifically, at a time period t1 shown in FIG. 16(e), the decision section 916 selects a 0th base (a pair of level 0 and level 64) corresponding to a value "0" of the multi-level code sequence 97, and sets an intermediate level 32 of the 0th base as the decision level. Since levels of multi-level signal 95 are generally distributed over lower levels than the decision level at the time period t1, the decision section 916 determines that the multi-level signal 95 is lower than the decision level. In a similar manner, at a time period t2, the decision section 916 selects a 63rd base (a pair of level 63 and level 127) corresponding to a value "63" of the multi-level code sequence 97, and sets an intermediate level 95 of the 63rd base as the decision level. Since the multi-level signal 95 is generally distributed over lower levels than the decision level at the time period t2, the decision section 916 decides that the multi-level signal 95 is lower than the decision level. At time periods t3 and t4 as well, decision is made in a similar manner. Accordingly, a result of the binary decision performed by the decision section 916 comes to "lower, lower, higher, lower".

In the case where the value of the multi-level code sequence 97 is even numbered (at the time periods t1 and t3), the decision section 916 decides that a lower level of the selected base is "0", and that a higher level thereof is "1", and then outputs the decided values as the information data 98. On the other hand, in the case where the value of the multi-level code sequence 97 is odd numbered (at the time periods t2 and t4), the decision section 916 decides that the lower level of the selected base is "1", and that the higher level thereof is "0", and then outputs the decided values as the information data 98. The values of the bits of the multi-level code sequence 97 are "0, 63, 0, 1", i.e., "even, odd, even, odd" (even representing an even number, and odd representing an odd number). Accordingly, the decision section 916 outputs "0, 1, 1, 1" as the information data 98, which is equal to the information data 90 (see FIG. 16(f)). In this manner, the decision section 916 can obtain the information data 98 from the multi-level signal 95 in which the values of the information data to be allocated to the lower level and higher level of the base are changed depending on whether the respective bits of the values of the multi-level code sequence 97 are even-numbered or odd-numbered.

As above described, the multi-level signal 95 includes the noise such as the shot noise which is generated through the photoelectric conversion performed by the demodulation section 915. However, intervals between the levels (hereinafter referred to as a step width) or the like are set appropriately, whereby a binary decision error may be suppressed to a negligible level.

Next, possible eavesdropping (including interception) will be described. As shown in FIG. 11, an eavesdropper attempts decryption of the information data 90 or the first key information 91 from the modulated signal 94 by using an eavesdropper receiving section 903, without having key information which is shared between the transmitting and receiving parties. The eavesdropper receiving section 903 includes a demodulation section 921, a multi-level decision section 922 and a decryption processing section 923, and is connected to the transmission line 910.

In the case where the eavesdropper performs the same binary decision as that performed by the legitimate receiving party (receiving section 902), the eavesdropper needs to attempt to perform decisions on all possible values which are taken by the key information, since the eavesdropper does not have the key information. However, when this method is used, the number of attempts of the decision increases exponentially along with an increase in a length of the key information. Therefore, if the length of the key information is significantly long, the method is not practical.

A further effective method is assumed in which the eavesdropper performs multi-level decision on a multi-level signal 81 by using a multi-level decision section 922, the multi-level signal 81 having been obtained through the photoelectric conversion performed by the demodulation section 921, decrypts a resultant received sequence 82 by using decryption processing section 923, and then attempts the decryption of the information data 90 or the first key information 91. In the case where the decryption method is used, if the eavesdropper receiving section 301 can receive (decide) the multi-level signal 93 as the received sequence 82 without mistake, it is possible to decrypt the first key information 91 from the received sequence 82 at a first attempt.

Since the shot noise, which is generated through the photoelectric conversion performed by the demodulation section 921, is overlapped on the modulated signal 94, the shot noise is included in the multi-level signal 81. It is known that the shot noise is inevitably generated in accordance with the principle of quantum mechanics. Accordingly, if the step width of the multi-level signal 93 is set significantly smaller than a distribution width of the shot noise, the multi-level signal 81 including the noise may be distributed over various levels other than a correct level (the level of the multi-level signal 93). For example, as shown in FIG. 16($g$), at the time period t3, the multi-level signal 81 is distributed over levels 63 to 65. Accordingly, the eavesdropper needs to perform the decryption while considering a possibility (a possibility of a decision error) that the level of the received sequence 82 obtained through the decision is different from the correct level. Therefore, compared to a case without the decision error (a stream cipher which applies the same random number generator as that used in the first multi-level code generation section 911), the number of the attempts, that is, the computational complexity required for the decryption is increased. As a result, security against the eavesdropping improves.

As above described, in the Y-00 protocol, a distance between signal points to be decided by the legitimate receiving party and the distance between the signal points to be decided by the eavesdropper are different from each other, whereby receiving performance of the legitimate receiving party and the security against the eavesdropping can be both ensured. The difference between the distances between the signal points are determined by the number of multi-levels of the multi-level code sequence 92. That is, when the number of the multi-levels of the multi-level code sequence 92 increases, the difference between the distance between the signal points for the legitimate receiving party and that for the eavesdropper increases, whereby security is further ensured.

In the conventional receiving apparatus 902, as shown in FIG. 14, all the bits of the multi-level code sequence 97 are used so as to generate the decision level 71 which changes dynamically. That is, the multi-level signal 95 and the decision level 71 are each an analog signal. Therefore, in order to ensure receiving performance, the decision level 71 needs to be generated highly precisely by the D/A conversion section 941 at the receiving end. Further, if the number of the multi-levels is increased in order to improve security, the number of bits of the multi-level code sequence 97 are also increased, and the decision level 71 needs to be generated highly precisely. To select the D/A conversion section 941 which is capable of generating the decision level 71 highly precisely leads to a problem in terms of a reduction in yields and consequent high apparatus costs.

SUMMARY OF THE INVENTION

Therefore, an object of the present invention is to solve the above-described problem, and also to realize a receiving apparatus which is capable of demodulating, without using highly precise component parts, information data from a multi-level modulated signal generated by using a Y-00 protocol.

The present invention is directed to a data receiving apparatus for reproducing, by using predetermined key information which is shared with a transmitting party, information data included in a modulated signal received from the transmitting party. In order to attain the above-described object, the data receiving apparatus comprises: a demodulation section for demodulating the modulated signal and converting the demodulated signal into a multi-level signal having multi-levels; a multi-level code generation section for generating, by using the predetermined key information, a multi-level code sequence which is a pseudo random number sequence composed of a plurality of bits; a soft decision section for performing a soft decision on the multi-level signal; a converted data identification section for identifying, from the multi-level signal, a value of converted information data in accordance with some of the bits or all of the bits composing the multi-level code sequence and in accordance with a result of the soft decision performed by the soft decision section, the converted information data being generated in accordance with predetermined bits composing a multi-level code sequence at an end of the transmitting party and the information data; and a data reproduction section for reproducing the information data in accordance with the predetermined bits composing the multi-level code sequence generated by the multi-level code generation section and the converted information data. The predetermined bits composing the multi-level code sequence generated by the multi-level code generation section is identical to the predetermined bits composing the multi-level code sequence at the end of the transmitting party. The soft decision section distinguishes between a confirmed area in which the multi-level signal corresponds to the value of the converted information data uniquely, and an unconfirmed area in which the multi-level signal corresponds to a plurality of the values of the converted information data.

Preferably, the unconfirmed area is set equal to or more than a width of an unconfirmed range of levels of the multi-levels inputted to the soft decision section.

Preferably, the converted data identification section determines the value of the converted information data uniquely when the result of the soft decision performed by the soft decision section corresponds to the confirmed area, and determines the value of the converted information data in accordance with some of the bits or all of the bits composing the multi-level code sequence when the result of the soft decision performed by the soft decision section corresponds to the unconfirmed area.

Further preferably, a highest-order bit of the multi-level code sequence is inputted to the converted data identification section. In this case, the converted data identification section may perform a logic decision on the value of the converted information data in accordance with the highest-order bit of the multi-level code sequence and the result of the soft decision performed by the soft decision section.

Further preferably, the information data has multi-levels consisting of two levels, and the soft decision section performs decision on three values, in two confirmed areas and one unconfirmed area which is situated between the two confirmed areas.

Further, the present invention is directed to a data receiving method for reproducing, by using predetermined key information which is shared with a transmitting party, information data included in a modulated signal received from the transmitting party. In order to attain the above-described object, the data receiving method comprises: a demodulation step of demodulating the modulated signal and converting the demodulated signal into a multi-level signal having multi-levels; a multi-level code generation step of generating, by using the predetermined key information, a multi-level code sequence which is a pseudo random number sequence composed of a plurality of bits; a soft decision step of performing soft decision on the multi-level signal; a converted data identification step of identifying, from the multi-level signal, a value of the converted information data in accordance with some of the bits or all of the bits composing the multi-level code sequence and a result of the soft decision, the converted information data being generated in accordance with predetermined bits composing the multi-level code sequence at an end of the transmitting party and the information data; and a data reproduction step of reproducing the information data in accordance with the predetermined bits composing the multi-level code sequence generated by the multi-level code generation section and the converted information data. The predetermined bits composing the multi-level code sequence generated by the multi-level code generation section are identical to the predetermined bits composing the multi-level code sequence at the end of the transmitting party. The soft decision step distinguishes between a confirmed area in which the multi-level signal corresponds to the value of the converted information data uniquely, and an unconfirmed area in which the multi-level signal corresponds to a plurality of the values of the converted information data.

According to the data receiving apparatus and the data receiving method of the present invention, a soft decision, in which decision levels of some bits of the multi-level code sequence are fixed, is used, and the information data is demodulated from the modulated signal. Accordingly, compared to the conventional receiving apparatus which is required to generate dynamically changing decision levels highly precisely, precision requirements for component parts used in the apparatus will be eased.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing a configuration of a data receiving apparatus according to a first embodiment of the present invention;

FIG. 7 is a diagram showing an exemplary configuration of a multi-level processing section 912 in the case where multi-level information data is transmitted;

FIG. 10 is a table illustrating a method for deciding the converted information data performed by the converted data identification section 224 in the case where the decision levels illustrated in FIG. 7 is used;

FIG. 15 is a diagram illustrating, in detail, operations of the conventional transmitting and receiving apparatuses; and FIG. 16 is a diagram illustrating, in detail, the operations of the conventional transmitting and receiving apparatus.

DESCRIPTION OF THE PREFERRED EMBODIMENTS

Figures 2, 3:
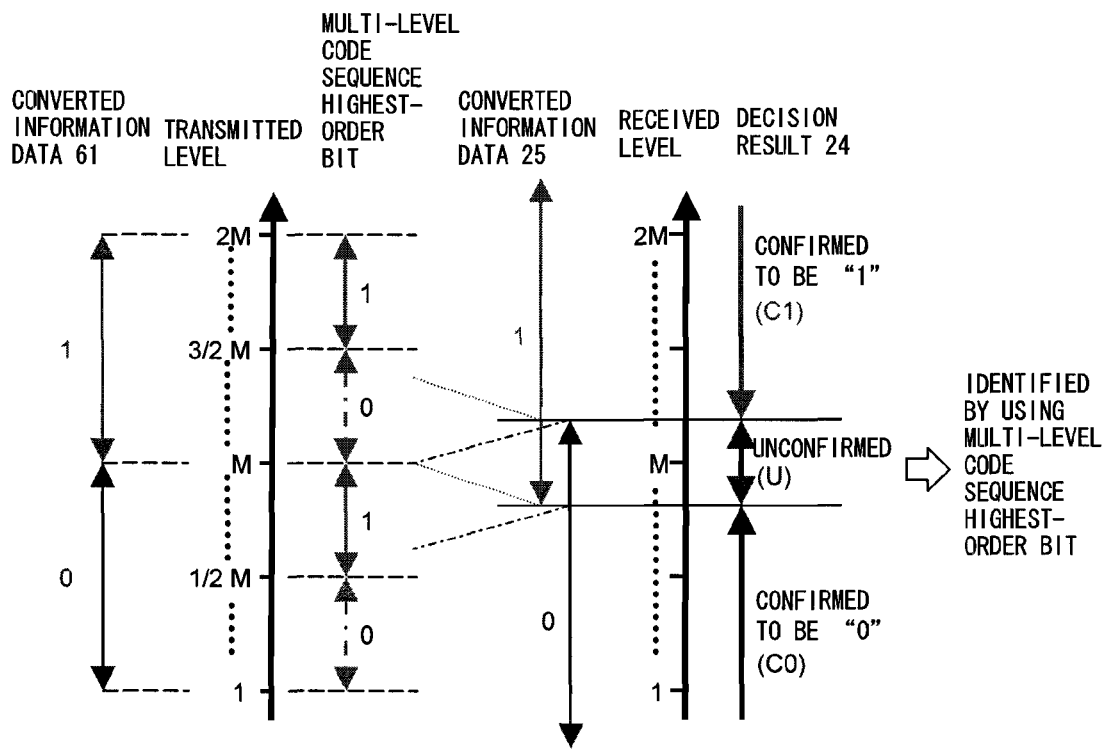
FIG. 2 is a diagram (1) showing an exemplary setting of decision levels used by a soft decision section 213 in the first embodiment of the present invention.
FIG. 3 is a table illustrating a method for determining converted information data performed by the converted data identification section 214 in the case where the decision levels illustrated in FIG. 2 is used.

Hereinafter, embodiments of the present invention will be described with reference to diagrams.

First Embodiment

FIG. 1 is a block diagram showing a configuration of a data receiving apparatus according to a first embodiment of the present invention. As shown in FIG. 1, the data receiving apparatus (hereinafter referred to as a receiving section) 201 is connected to a transmitting apparatus (hereinafter referred to as a transmitting section) 101 via a transmission line 110. The transmitting section 101 generates, in accordance with a procedure illustrated by using (a) to (c) shown in FIG. 15, a modulated signal 20 by using information data 10 and key information which is shared with a receiving party. A configuration of the transmitting section 101 may be set arbitrarily, however, the present embodiment describes a case where a configuration thereof is the same as those of the conventional transmitting apparatuses shown in FIGS. 11 and 13. Further, the present embodiment describes a case where a modulated signal 20 is an optical intensity modulated signal, or an amplitude modulated signal which is obtained by amplitude-modulating an electrical signal. As the transmission line 110, an optical waveguide such as an optical-fiber cable, or a metal line such as a LAN cable or a coaxial line may be used. Alternatively free space which enables a wireless signal to be transmitted may be used.

The receiving section 201 previously retains key information 21 which is identical in content to that retained by the transmitting section. In the receiving section 201, the demodulation section 211 demodulates the modulated signal 20 transmitted via the transmission line 110, and outputs a resultant thereof as a multi-level signal 22. The multi-level code generation section 212 generates and outputs a multi-level code sequence 23, which is a multi-level pseudo random number, by using the key information 21. As a method for generating the multi-level code sequence 23, any method such as a method in which a plurality of pseudo random number generators is used in a combined manner and a method in which a conversion mapping is used may be applicable, as long as a multi-level code sequence which is identical to that generated in a transmitting end can be outputted. Alternatively, the multi-level code generation section 212 may generate and output only such bits of the multi-level code sequence 23 that are to be used in a converted data identification section 214 or in a data reproduction section 215. As shown in FIG. 1, the multi-level code sequence 23 is represented as a parallel signal.

Figure 12:
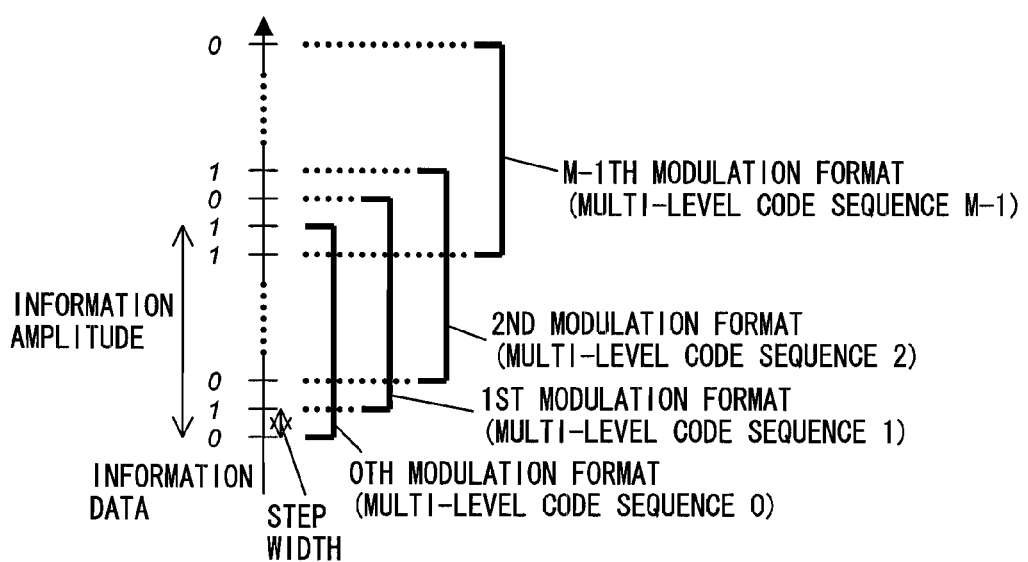
FIG. 12 is a diagram showing an exemplary signal format used in the conventional transmitting and receiving apparatus.

The soft decision section 213 performs a soft decision on the multi-level signal 22, and outputs a resultant thereof as a decision result 24. The converted data identification section 214 identifies values of converted information data 25 which are used for generating the modulated signal 20, by using the decision result 24 and highest-order bit 23M of the multi-level code sequence 23, and outputs a resultant of the identification. The data reproduction section 215 performs an XOR operation between the converted information data 25 and a lowest-order bit 23L of the multi-level code sequence, in the same manner as the data reproduction section 943 of the conventional receiving apparatus, and outputs a resultant thereof as information data 26. Correspondence relations between levels of the received modulated signal 20 and values of the information data 26 may be different from that shown in FIG. 12. In this case, the data reproduction section 215 performs predetermined conversion processing in accordance with the correspondence relations between the levels of the received modulated signal 20 and the values of the information data 26. Instead of the lowest-order bit 23L of the multi-level code sequence, a bit of the multi-level code sequence 23, the bit being necessary for the predetermined conversion processing, is then inputted to the data reproduction section 215.

Figure 13:
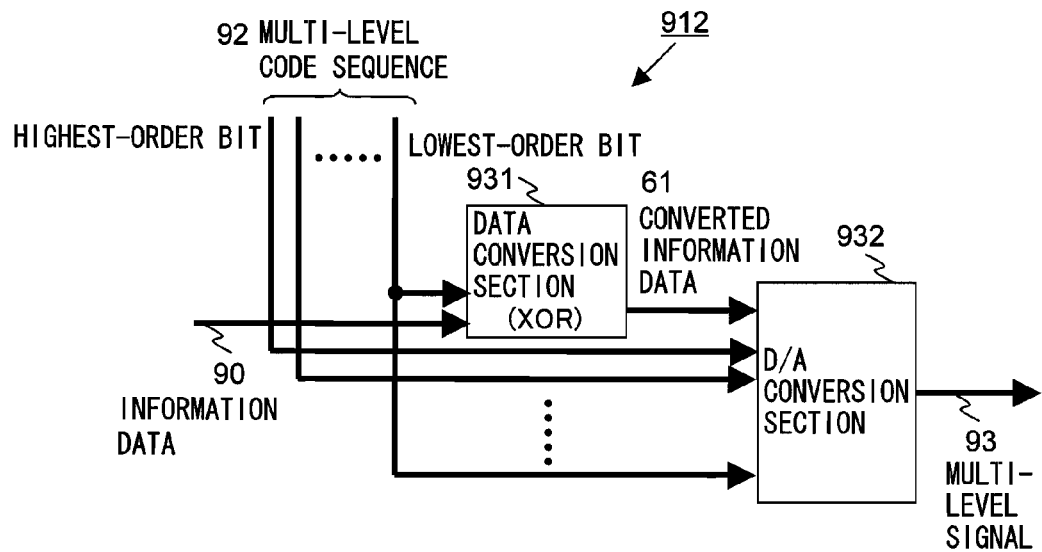
FIG. 13 is a diagram showing an exemplary configuration of a multi-level processing section 912 in the conventional transmitting and receiving apparatuses.
Figure 14:
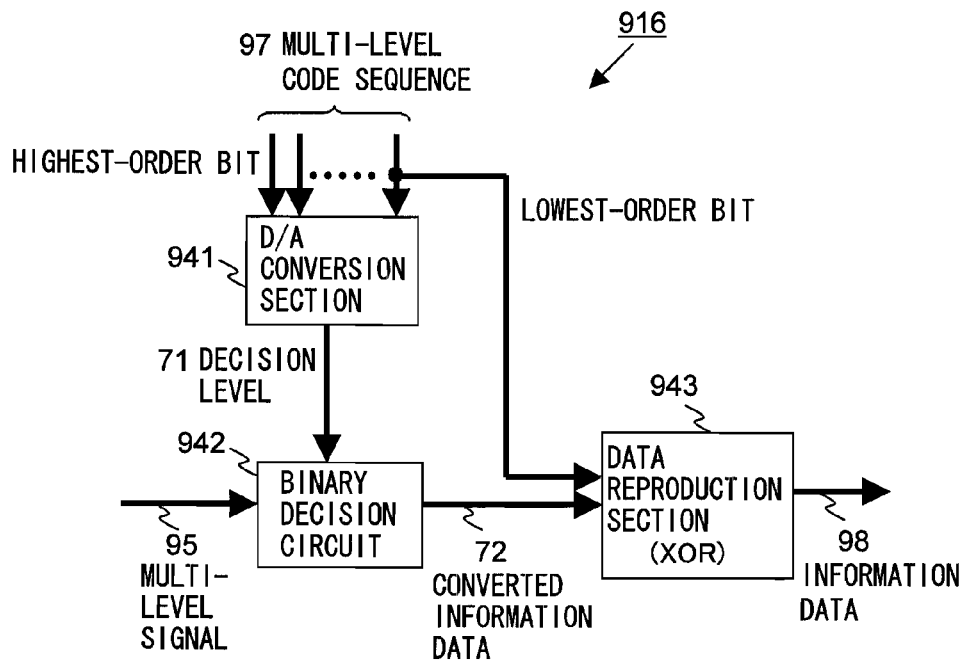
FIG. 14 is a diagram showing an exemplary configuration of a decision section 916 in the conventional transmitting and receiving apparatuses.

Next, with reference to FIGS. 2 and 13, an operation of the soft decision section 213 will be described in detail. FIG. 2 shows, on the left side thereof, relations among levels of a multi-level signal 93 in the transmitting section 101 (hereinafter referred to as transmitting levels), values of the converted information data 61, and values of the highest-order bit of the multi-level code sequence 92. As shown in FIG. 2, an upper half of a range of the transmitting levels correspond to a value "1" of the converted information data 61, and a lower half of the range corresponds to a value "0" of the same. When the range of the transmitting levels is divided into four, the divided four portions respectively correspond to values "1", "0", "1", "0" of the highest-order bit of the multi-level code sequence 92, from a top to a bottom thereof.

On the other hand, levels of the multi-level signal 22 in the receiving section 201 (hereinafter referred to as received levels) may become equivalent to values which are different from the transmitting levels due to effects of a noise and a waveform distortion which are generated in the transmission line 110 and the demodulation section 211. Therefore, portions of a range of the received levels, the portions respectively corresponding to the values "1" and "0" of the converted information data 25 are wider than portions of the range on the transmitting end, as shown on the right side of FIG. 2 (for the sake of a simple illustration, intervals of any two levels corresponding to a common base between the transmitting end and the receiving end are indicated to be identical to each other). Accordingly, at around an intermediate position of the range of the received levels, there is an area in which the value of the converted information data 25 may become equivalent to both "1" and "0" (hereinafter the area referred to as an unconfirmed area). On the other hand, in the remaining areas, the value of the converted information data 25 is confirmed uniquely (hereinafter, the area being referred to as a confirmed area).

Decision levels are set at both ends of the unconfirmed area, and the following three cases of decisions are performed: a case where the value of the converted information data 25 is confirmed to be "1" (C1); a case where the value thereof is unconfirmed (U); and a case where the value thereof is confirmed to be "0" (C0). Since the noise such as a thermal noise is distributed in accordance with a Gaussian distribution, in a precise sense, there are probabilities that the value of the converted information data 25 will be decided as both "1" and "0" at any position in the received levels. However, if a possibility that either "1" or "0" of the converted information data 25 will be decided is equal to or less than a predetermined error rate of the information data 26, such possibility may be ignored.

A case will be considered where a width of the unconfirmed area is equal to or less than a quarter of a maximum amplitude of the multi-level signal 22. In a portion of the range of the received levels, which is included in the unconfirmed area, the value of the converted information data 25 and a value of the highest-order bit of the multi-level code sequence have the following correspondence relation. That is, when the value of the converted information data 25 is "1", the value of the highest-order bit of the multi-level code sequence is "0". On the other hand, when the value of the converted information data 25 is "0", the value of the highest-order bit of the multi-level code sequence is "1". Therefore, in accordance with the correspondence relation, the value of the converted information data 25 can be identified by the converted data identification section 214 by using the highest-order bit of the multi-level code sequence. FIG. 3 shows a method for identifying the converted information data 25 by the converted data identification section 214. In the case where the decision results are "C1" and "C0", the values of the converted information data 25 are uniquely decided as "1" and "0", respectively. In the case where the decision result is "U", if the value of the highest-order bit of the multi-level code sequence is "1", the value of the converted information data 25 is identified as "0", whereas if the value of the highest-order bit of the multi-level code sequence is "0", the value of the converted information data 25 is identified as "1".

Borderlines of the unconfirmed area are not necessarily set strictly so as to border an area in which the value of the converted information data 61 may become equivalent to both "1" and "0", but may be set for an area wider than such area. For example, even if a width of the area, in which the value of the converted information data 61 may become equivalent to both "1" and "0", is smaller than the quarter of the maximum amplitude of the multi-level signal 22, the width of the unconfirmed area may be set equal to the quarter of the maximum amplitude of the multi-level signal 22.

As a specific configuration of the soft decision section 213, for example, there may be adopted a configuration in which a plurality of binary decision circuits respectively having different decision levels are arranged in parallel, the multi-level signal 22 is inputted to the binary decision circuits, and decision results 24 are obtained based on outputs from the binary decision circuits. Alternatively, instead of the plurality of binary decision circuits, an A/D converter may be applicable.

Figures 4, 5:
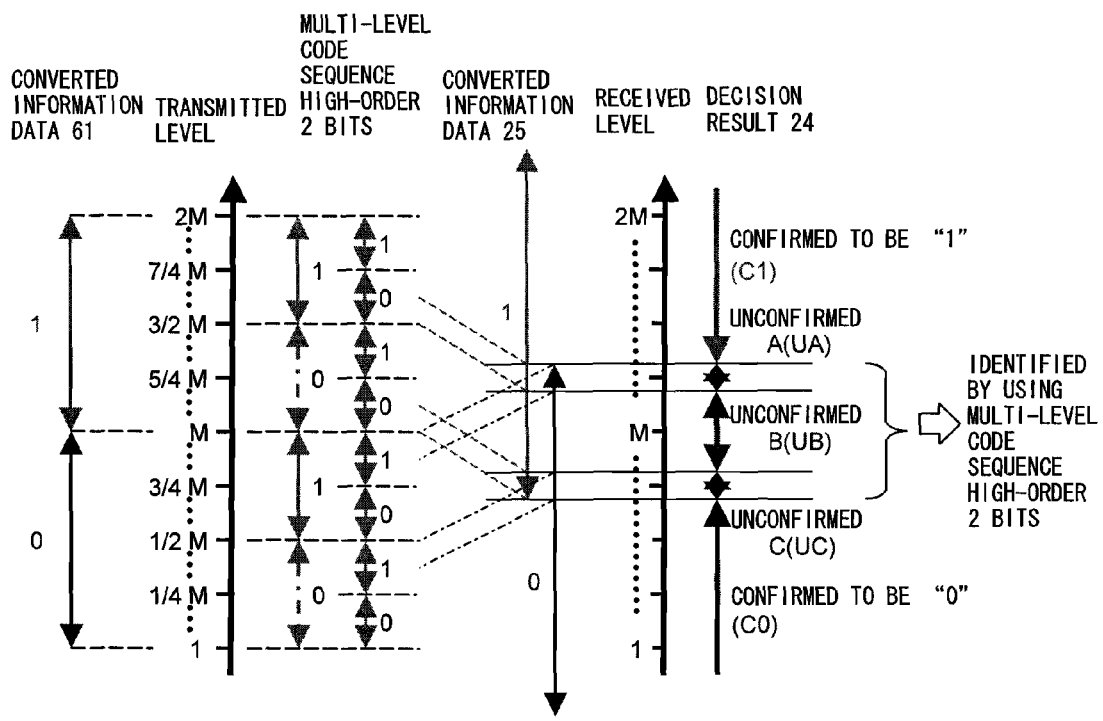
FIG. 4 is a diagram (2) showing another exemplary setting of the decision levels used by the soft decision section 213 in the first embodiment of the present invention.
FIG. 5 is a table illustrating the method for determining the converted information data performed by the converted data identification section 214 in the case where the decision levels illustrated in FIG. 4 is used.

The above description is exemplified by the case where the width of the unconfirmed area is equal to or less than the quarter of the maximum amplitude of the multi-level signal 22. On the other hand, when the width of the unconfirmed area is larger than the quarter of the maximum amplitude of the multi-level signal 22 for the reason of a big noise or the like, the unconfirmed area is divided into smaller segments so as to perform the decision on the segments by the soft decision section 213, and the identification is performed by the converted data identification section 214 by using more bits of the multi-level code sequence 23. FIG. 4 shows an exemplary setting of the decision levels in the case where the width of the unconfirmed area is equal to or more than the quarter and equal to or less than three eights of the maximum amplitude of the multi-level signal 22. In the example, the unconfirmed area is divided into three, and the identification is performed by using high-order 2 bits of the multi-level code sequence. The transmitted levels and the high-order 2 bits of the multi-level code sequence have correspondence relations as shown on the left side of FIG. 4. An upper limit of an intermediate area (an unconfirmed area B, (UB)) in the unconfirmed areas is set so as to correspond to a possible lower limit of the received levels in the case where a signal of a level corresponding to the value "1" of the converted information data 25 and the value "1" of the highest-order bit of the multi-level code sequence is transmitted. On the other hand, a lower limit of the unconfirmed area B is set so as to correspond to a possible upper limit of the received levels in the case where the signal of a level corresponding to the value "0" of the converted information data 25 and the value "0" of the highest-order bit of the multi-level code sequence is transmitted.

Among the divided unconfirmed areas, other than the unconfirmed area B, an upper area is referred to as an unconfirmed area A (UA), and a lower area is referred to as an unconfirmed area C (UC). In the unconfirmed area A, the value of the converted information data 25 is "0" only in the case where the high-order 2 bits of the multi-level code sequence are "1, 1". On the other hand, the value of the converted information data 25 is "1", in the case where the high-order 2 bits of the multi-level code sequence are values other than "1, 1". In the unconfirmed area B, the value of the converted information data 25 is "0" only in the case where the value of the highest-order bit of the multi-level code sequence is "1". On the other hand, the value of the converted information data 25 is "1" only in the case where the value of the highest-order bit of the multi-level code sequence is "0". In the unconfirmed area C, the value of the converted information data 25 is "1" only in the case where the high-order 2 bits of the multi-level code sequence are "0, 0". On the other hand, the value of the converted information data 25 is "0" in the case where the high-order 2 bits of the multi-level code sequence are values other than "0, 0".

Accordingly, in accordance with the relations, the value of the converted information data 25 can be identified by the converted data identification section 214 by using the high-order 2 bits of the multi-level code sequence 23. FIG. 5 is a table showing a method for determining the converted information data 25 in the case where the decision levels shown in FIG. 4 are used. In the case where the decision results 24 are "C1" and "C0", the values of the converted information data 25 are uniquely decided as "1", and "0", respectively. In the case where the decision result 24 is "UA", if the high-order 2 bits of the multi-level code sequence 23 are "1, 1", the value of the converted information data 25 is identified as "0", whereas if the high-order 2 bits thereof are values other than "1, 1", the value of the converted information data 25 is identified as "1". In the case where the decision result is "UB", if the value of the highest-order bit 23M of the multi-level code sequence is "1", the value of the converted information data 25 is identified as "0", whereas if the value of the highest-order bit 23M of the multi-level code sequence is "0", the value of the converted information data 25 is identified as "1". In the case where the decision result is "UC", if the high-order 2 bits of the multi-level code sequence 23 are "0,0", the value of the converted information data 25 is identified as "1", whereas if the high-order 2 bits thereof are values other than "0, 0", the value of the converted information data 25 is identified as "0".

Although detailed description is omitted, if the noise is further increased and the width of the unconfirmed area becomes equal to or more than three eighths of the maximum amplitude of the multi-level signal 22, the unconfirmed area may be divided into further smaller segments so as to perform the decision on the segments, and the identification is performed by using further more bits of the multi-level code sequence 23.

As above described, according to the present embodiment, by using the soft decision in which the decision levels are fixed, the information data 26 is demodulated from the modulated signal 20. Accordingly, precision requirements for component parts used in the receiving apparatus may be eased, compared to the conventional receiving apparatus which needs to precisely generate the decision levels which change dynamically.

Second Embodiment

The present embodiment generalizes the first embodiment, and assumes a case where a modulated signal 20, which is generated based on the information data 10 having multi-levels, is received. Hereinafter, an exemplary case will be described where the number of the multi-levels of the information data 10 is 4.

Figure 6:
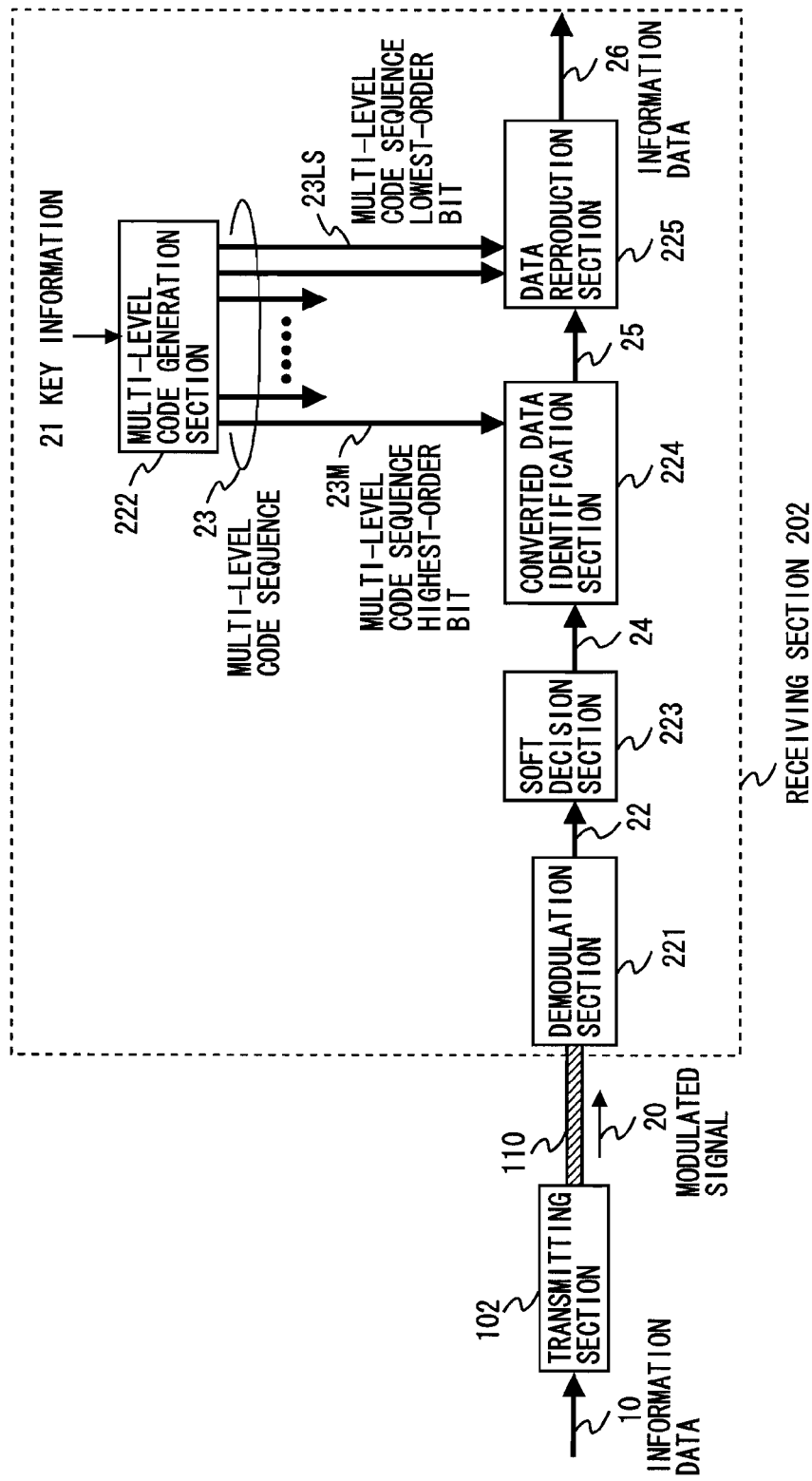
FIG. 6 is a block diagram showing a configuration of a data receiving apparatus according to a second embodiment of the present invention.

FIG. 6 is a block diagram showing a configuration of a data receiving apparatus according to a second embodiment of the present invention. A basic configuration of the present embodiment is the same as that of the first embodiment, and thus parts which are different from the first embodiment will be mainly described.

Figure 11:
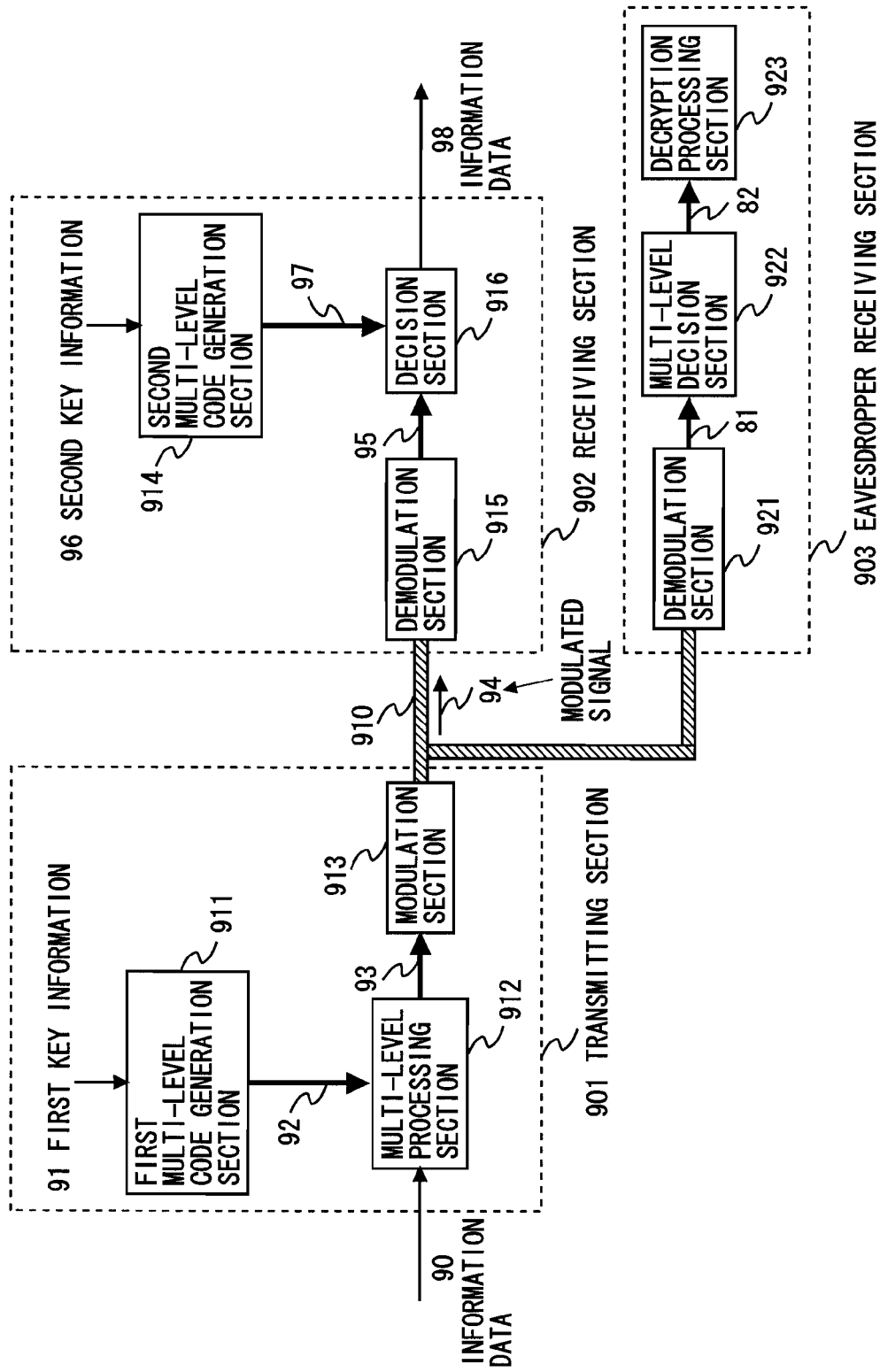
FIG. 11 is a diagram illustrating an example of conventional transmitting and receiving apparatuses using the Y-00 protocol disclosed in Patent document 1.

A configuration of a transmitting section 102 is essentially the same as that of the transmitting section 901 shown in FIG. 11, and as the configuration of the multi-level processing section 912, a configuration as shown in FIG. 7 is used, for an example. As shown in FIG. 7, a data conversion section 121 performs a predetermined conversion in accordance with the information data 10 and low-order 2 bits of a multi-level code sequence 31, and generates and outputs a converted information data 32. The conversion corresponds to an allocation in which the levels of values "0" to "3" of the information data 10 are allocated to the whole of the 4M levels so as to be distributed evenly. The converted information data 32 and the respective bits of the multi-level code sequence 31 are inputted to the D/A conversion section 122 (the converted information data 32 being inputted to a high-order bit), and are subject to the D/A conversion. A resultant thereof is outputted as a multi-level signal 33.

Figure 8:
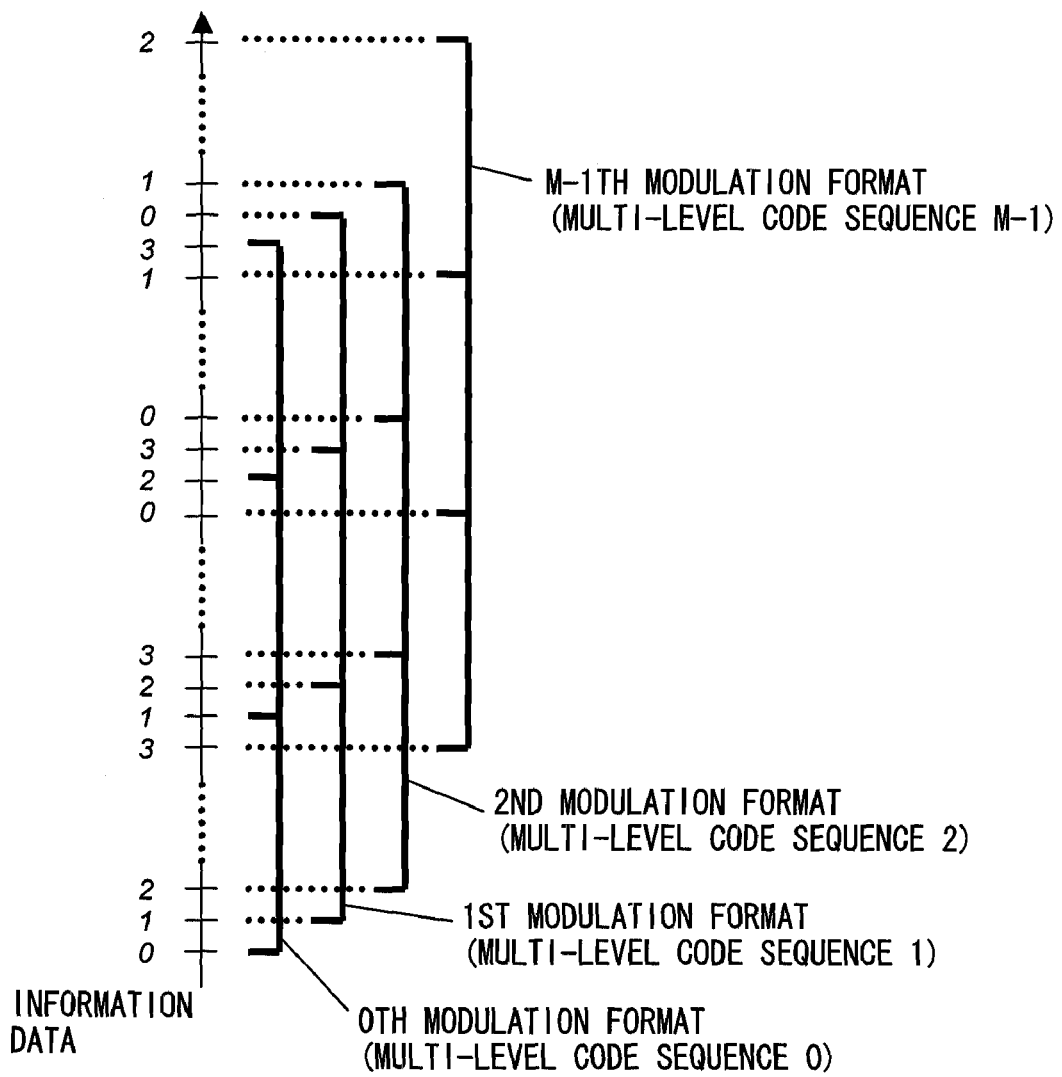
FIG. 8 is a diagram showing an exemplary signal format in the case where the multi-level information data is transmitted by using a Y-00 protocol.

FIG. 8 is an exemplary signal format used in the present embodiment. As shown in FIG. 8, in the case where the multi-level code sequence 31 has M bits of values, the signal intensity is divided into 4M levels. These 4M levels are divided by 4 so as to generate M combinations (hereinafter referred to as bases), each having 4 levels. The values "0" to "3" of the information data 10 are allocated to the 4 levels included in each of the bases. Generally, the values "0" to "3" of the information data 10 are allocated such that the respective values are distributed evenly over the whole of the 4M levels.

In a receiving section 202, functions of a demodulation section 221 and a multi-level code generation section 222 are the same as those described in the first embodiment. A soft decision section 223 and a converted data identification section 224 will be described later in detail. A data reproduction section 225 performs predetermined conversion processing by using the converted information data 25 and a low-order bit 23LS of the multi-level code sequence in accordance with correspondence relations between the levels and the information data shown in FIG. 8, and then reproduces and outputs the information data 26.

Figure 9:
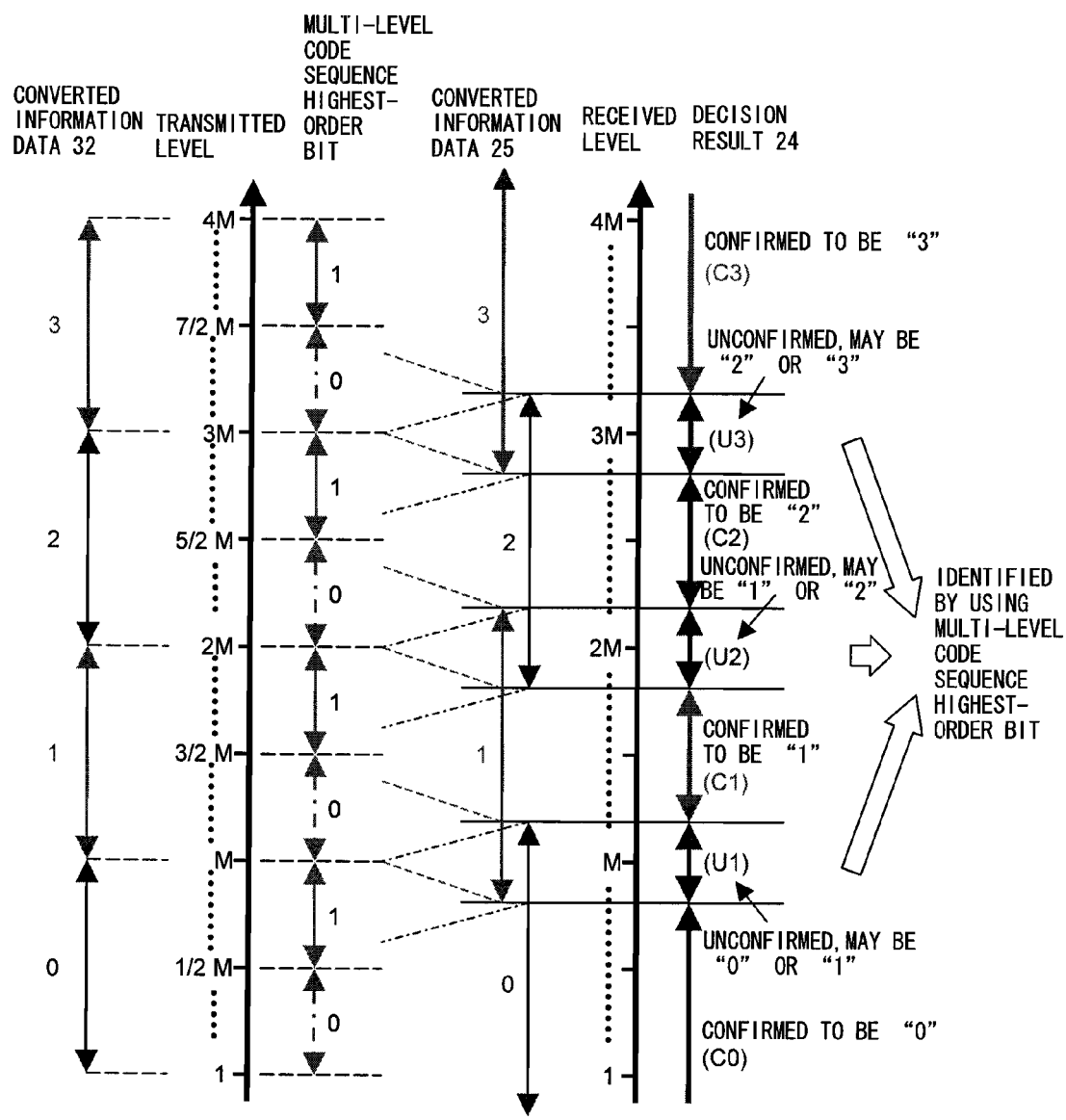
FIG. 9 is a diagram showing an exemplary setting of decision levels used by a soft decision section 223 in the second embodiment of the present invention.

Next, with reference to FIG. 9, an operation of the soft decision section 223 will be described in detail. FIG. 9 shows, on the left side thereof, relations between values of the converted information data 32 and values of the highest-order bit of the multi-level code sequence 31. As shown in FIG. 9, when a range of the transmitted levels is divided into four, the values "3", "2", "1", "0" of the converted information data 32 correspond to the divided four portions of the range, respectively, from a top to a bottom thereof.

On the other hand, portions of a range of the received levels corresponding to the respective values "3", "2", "1", "0" of the converted information data 32 are, as shown on the right of FIG. 9, each wider than that shown on the transmitting end due to the effects of the noise and the wave form distortion. Therefore, on the receiving end, there are confirmed areas in which the values of the converted information data 25 are each uniquely confirmed, and in addition, there are unconfirmed areas, between the confirmed areas, in which the converted information data 25 may become equivalent to a plurality of values. Accordingly, the decision levels are set at both ends of the unconfirmed areas, and the following seven cases of decisions are performed: a case where the value of the converted information data 25 is confirmed to be "3" (C3); a case where the value is unconfirmed (U3), and the value may be either "2" or "3"; a case where the value is confirmed to be "2" (C2); a case where the value is unconfirmed, and may be either "1" or "2" (U2); a case where the value is confirmed to be "1" (C1); a case where the value is unconfirmed, and may be either "0" or "1" (U1); and a case where the value is confirmed to be "0" (C0).

A case will be considered where the width of the unconfirmed area is equal to or less than an eighth of the maximum amplitude of the multi-level signal 22. In the case where a portion of the received levels corresponds to the unconfirmed area U3, the value of the converted information data 25 and the value of the highest-order bit of the multi-level code sequence have the following correspondence relation. That is, when the value of the converted information data 25 is "3", the value of the highest-order bit of the multi-level code sequence is "0". On the other hand, when the value of the converted information data 25 is "2", the value of the highest-order bit of the multi-level code sequence is "1". In the case of the unconfirmed area U2, when the value of the converted information data 25 is "2", the value of the highest-order bit of the multi-level code sequence is "0", whereas when the value of the converted information data 25 is "1", the value of the highest-order bit of the multi-level code sequence is "1". In the case of the unconfirmed area U1, when the value of the converted information data 25 is "1", the value of the highest-order bit of the multi-level code sequence is "0", whereas when the value of the converted information data 25 is "0", then the value of the highest-order bit of the multi-level code sequence is "1".

In accordance with the relations, the converted data identification section 214 is capable of identifying the value of the converted information data 25 by using the highest-order bit of the multi-level code sequence. FIG. 10 shows a method for identifying the converted information data 25 by the converted data identification section 224. As shown in FIG. 10, when the decision results 24 are "C3", "C2", "C1", "C0", the values of the converted information data 25 are uniquely decided as "3", "2", "1", "0", respectively. In the case where the decision result 24 is "U3", when the value of the highest-order bit of the multi-level code sequence is "1", the converted information data 25 is identified as "2", whereas when the value of the highest-order bit of the multi-level code sequence is "0", the converted information data 25 is identified as "3". In the case where the decision result 24 is "U2", when the value of the highest-order bit of the multi-level code sequence is "1", the converted information data 25 is identified as "1", whereas when the value of the highest-order bit of the multi-level code sequence is "0", then the converted information data 25 is identified as "2". In the case where the decision result 24 is "U1", when the value of the highest-order bit of the multi-level code sequence is "1", the converted information data 25 is identified as "0", whereas when the value of the highest-order bit of the multi-level code sequence is "0", the converted information data 25 is identified as "1".

Borderlines of each of the unconfirmed areas are not necessarily set strictly so as to border an area in which the value of the converted information data 32 may become equivalent to a plurality of values, but may be set wider than this area. For example, even if a width of the area, in which the value of the converted information data 32 may become equivalent to the plurality of values, is smaller than the eighth of the maximum amplitude of the multi-level signal 22, the width of the unconfirmed area may be set equal to the eighth of the maximum amplitude of the multi-level signal 22.

The above description is exemplified by the case where the width of the unconfirmed area is equal to or less than the eighth of the maximum amplitude of the multi-level signal 22. On the other hand, when the width of the unconfirmed area is larger than the eighth of the maximum amplitude of the multi-level signal 22 for the reason of a big noise or the like, the unconfirmed area is divided into smaller segments so as to perform the decision on the segments by the soft decision section 223, and the identification is performed by the converted data identification section 214 by using further more bits of the multi-level code sequence 23. Further, the above description is exemplified by the case where the number of the multi-levels of the information data 10 is four. However, even in the case where the number of the multi-levels is greater than 4, the decision is performed with respect to each of the confirmed areas and the unconfirmed areas, in a similar manner. With respect to each of the unconfirmed areas, the value of the converted information data 25 is identified by using some bits of the multi-level code sequence. Accordingly, a similar receiving apparatus can be realized.

As above described, according to the present embodiment, as with the case of the first embodiment, even in the case where the number of the multi-levels of the information data 10 is greater than 2, precision requirements for component parts used in the receiving apparatus may be eased compared to the conventional receiving apparatus.

The above-described two embodiments are each exemplified by the case where the optical intensity modulation or electrical amplitude modulation is applied. However, even in the case where other modulation formats than these are used, it is understood that the above-described method may be applicable.

The present invention is applicable to an apparatus for performing cipher communication which prevents interception by a third party, and is particularly useful in preventing decryption of the modulated signal on the transmission line.

While the invention has been described in detail, the foregoing description is in all aspects illustrative and not restrictive. It is understood that numerous other modifications and variations can be devised without departing from the scope of the invention.

What is claimed is:

1. A data receiving apparatus for reproducing, by using predetermined key information which is shared with a transmitting party, information data included in a modulated signal received from the transmitting party, the data receiving apparatus comprising:
   a demodulation section for demodulating the modulated signal and converting the demodulated signal into a multi-level signal having multi-levels;
   a multi-level code generation section for generating, by using the predetermined key information, a multi-level code sequence which is a pseudo random number sequence composed of a plurality of bits;
   a soft decision section for performing a soft decision on the multi-level signal;
   a converted data identification section for identifying, from the multi-level signal, a value of converted information data in accordance with some of the bits or all of the bits composing the multi-level code sequence and in accordance with a result of the soft decision performed by the soft decision section, the converted information data being generated in accordance with predetermined bits composing a multi-level code sequence at an end of the transmitting party and the information data; and
   a data reproduction section for reproducing the information data in accordance with the predetermined bits composing the multi-level code sequence generated by the multi-level code generation section and the converted information data, wherein
   the predetermined bits composing the multi-level code sequence generated by the multi-level code generation section is identical to the predetermined bits composing the multi-level code sequence at the end of the transmitting party, and
   the soft decision section distinguishes between a confirmed area in which the multi-level signal corresponds to the value of the converted information data uniquely, and an unconfirmed area in which the multi-level signal corresponds to a plurality of the values of the converted information data.

2. The data receiving apparatus according to claim 1, wherein the unconfirmed area is set equal to or more than a width of an unconfirmed range of levels of the multi-levels inputted to the soft decision section.

3. The data receiving apparatus according to claim 1, wherein
   the converted data identification section
      determines the value of the converted information data uniquely when the result of the soft decision performed by the soft decision section corresponds to the confirmed area, and
      determines the value of the converted information data in accordance with some of the bits or all of the bits composing the multi-level code sequence when the result of the soft decision performed by the soft decision section corresponds to the unconfirmed area.

4. The data receiving apparatus according to claim 1, wherein the converted data identification section performs a logic decision on the value of the converted information data in accordance with a highest-order bit of the multi-level code sequence and the result of the soft decision performed by the soft decision section.

5. The data receiving apparatus according to claim 1, wherein
   the information data has multi-levels consisting of two levels, and
   the soft decision section performs decision on three values, in two confirmed areas and one unconfirmed area which is situated between the two confirmed areas.

6. A data receiving method for reproducing, by using predetermined key information which is shared with a transmitting party, information data included in a modulated signal received from the transmitting party, the data receiving method comprising:
   a demodulation step of demodulating the modulated signal and converting the demodulated signal into a multi-level signal having multi-levels;
   a multi-level code generation step of generating, by using the predetermined key information, a multi-level code sequence which is a pseudo random number sequence composed of a plurality of bits;
   a soft decision step of performing soft decision on the multi-level signal;
   a converted data identification step of identifying, from the multi-level signal, a value of the converted information data in accordance with some of the bits or all of the bits composing the multi-level code sequence and a result of the soft decision, the converted information data being generated in accordance with predetermined bits composing the multi-level code sequence at an end of the transmitting party and the information data; and
   a data reproduction step of reproducing the information data in accordance with the predetermined bits composing the multi-level code sequence generated by the multi-level code generation section and the converted information data, wherein
   the predetermined bits composing the multi-level code sequence generated by the multi-level code generation section are identical to the predetermined bits composing the multi-level code sequence at the end of the transmitting party, and
   the soft decision step distinguishes between a confirmed area in which the multi-level signal corresponds to the value of the converted information data uniquely, and an unconfirmed area in which the multi-level signal corresponds to a plurality of the values of the converted information data.

* * * * *